(12) United States Patent
Tsujita et al.

(10) Patent No.: US 8,768,114 B2
(45) Date of Patent: Jul. 1, 2014

(54) OPTO-ELECTRIC HYBRID BOARD AND METHOD OF MANUFACTURING SAME

(71) Applicant: Nitto Denko Corporation, Ibaraki (JP)

(72) Inventors: Yuichi Tsujita, Ibaraki (JP); Yasuto Ishimura, Ibaraki (JP); Hiroyuki Hanazono, Ibaraki (JP); Naoyuki Tanaka, Ibaraki (JP); Yasufumi Yamamoto, Ibaraki (JP); Shotaro Masuda, Ibaraki (JP); Mayu Ozaki, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 0 days.

(21) Appl. No.: 13/775,445

(22) Filed: Feb. 25, 2013

(65) Prior Publication Data
US 2013/0243370 A1    Sep. 19, 2013

(30) Foreign Application Priority Data

Mar. 16, 2012    (JP) .................................. 2012-060632

(51) Int. Cl.
*G02B 6/12* (2006.01)
(52) U.S. Cl.
USPC .................. 385/14; 385/40; 216/17; 430/324
(58) Field of Classification Search
USPC ............ 385/14, 39, 40; 216/17; 430/321–324
See application file for complete search history.

(56) References Cited

U.S. PATENT DOCUMENTS

| 7,306,689 | B2* | 12/2007 | Okubora et al. .............. 156/239 |
| 2007/0189661 | A1* | 8/2007 | Nakashiba et al. ............. 385/14 |
| 2008/0252620 | A1 | 10/2008 | Shimizu |
| 2009/0269704 | A1 | 10/2009 | Hodono |
| 2010/0195967 | A1 | 8/2010 | Wang et al. |
| 2011/0097034 | A1 | 4/2011 | Uemura et al. |
| 2011/0188816 | A1 | 8/2011 | Uemura et al. |
| 2011/0222815 | A1 | 9/2011 | Hamana et al. |
| 2012/0045168 | A1 | 2/2012 | Uemura et al. |

FOREIGN PATENT DOCUMENTS

| JP | 2009-265342 A | 11/2009 |
| JP | 2010-164655 A | 7/2010 |
| JP | 2011-221143 A | 11/2011 |
| WO | 2011/125658 A1 | 10/2011 |

OTHER PUBLICATIONS

European Search Report dated Jul. 22, 2013, issued in European patent application No. 13156933.7.

* cited by examiner

*Primary Examiner* — Ellen Kim
(74) *Attorney, Agent, or Firm* — Westerman, Hattori, Daniels & Adrian, LLP

(57) ABSTRACT

An opto-electric hybrid board which is capable of suppressing the increase in light propagation losses and which is excellent in flexibility, and a method of manufacturing the same are provided. The opto-electric hybrid board includes an electric circuit board, an optical waveguide, and a metal layer. The electric circuit board includes an insulative layer having front and back surfaces, and electrical interconnect lines formed on the front surface of the insulative layer. The optical waveguide is formed on the back surface of the insulative layer of the electric circuit board. The metal layer is formed between the optical waveguide and the back surface of the insulative layer of the electric circuit board. The metal layer is patterned to have a plurality of strips. Cores of the optical waveguide are disposed in a position corresponding to a site where the metal layer is removed by the patterning.

4 Claims, 7 Drawing Sheets

RELATED ART

OPTO-ELECTRIC HYBRID BOARD AND METHOD OF MANUFACTURING SAME

BACKGROUND OF THE INVENTION

1. Field of the Invention

The present invention relates to an opto-electric hybrid board including an optical waveguide and an electric circuit board which are stacked together, and a method of manufacturing the same.

2. Description of the Related Art

With the increase in the amount of transmission information, optical interconnection in addition to electrical interconnection has been used in recent electronic devices and the like. As an example of such a technique, an opto-electric hybrid board has been disclosed in Japanese Laid-open Patent Application Publication No. 2010-164655. As shown in FIG. 10, this opto-electric hybrid board includes: an electric circuit board $E_0$ including an insulative substrate 51 made of polyimide and the like, and electrical interconnect lines 52 formed on the front surface of the insulative substrate 51; and an optical waveguide (optical interconnect lines) $W_0$ (including an under cladding layer 56, cores 57 and an over cladding layer 58) made of epoxy resin and the like and stacked on the back surface (a surface opposite from the surface with the electrical interconnect lines 52 formed thereon) of the insulative substrate 51.

In the aforementioned opto-electric hybrid board, however, the insulative substrate 51 (polyimide resin and the like) and the optical waveguide $W_0$ (epoxy resin and the like) are in contact with each other. A difference in coefficient of linear expansion between the insulative substrate 51 and the optical waveguide $W_0$ causes stresses and slight bending in the optical waveguide $W_0$ at ambient temperature, resulting in increased light propagation losses in the optical waveguide $W_0$.

Another opto-electric hybrid board, on the other hand, has been disclosed in Japanese Laid-open Patent Application Publication No. 2009-265342. As shown in FIG. 11, this opto-electric hybrid board includes a stainless steel layer $M_0$ provided entirely between the insulative substrate 51 and the optical waveguide $W_0$. In this opto-electric hybrid board, the stainless steel layer $M_0$ serves as a reinforcement to prevent stresses and slight bending in the optical waveguide $W_0$, thereby suppressing the increase in light propagation losses.

The opto-electric hybrid board is required to suppress the increase in light propagation losses, as stated above. In addition to this, the opto-electric hybrid board is required to have flexibility in some cases. However, the stainless steel layer $M_0$ acts as an impediment to flexibility when provided entirely as mentioned above (with reference to FIG. 11) for the purpose of decreasing the light propagation losses.

SUMMARY OF THE INVENTION

In view of the foregoing, an opto-electric hybrid board which is capable of suppressing the increase in light propagation losses and which is excellent in flexibility, and a method of manufacturing the same are provided.

The opto-electric hybrid board comprises: an electric circuit board including an insulative layer having front and back surfaces, and electrical interconnect lines formed on the front surface of the insulative layer; an optical waveguide including a cladding layer and cores, the optical waveguide being formed on the back surface of the insulative layer of the electric circuit board; and a metal layer formed between the cladding layer of the optical waveguide and the back surface of the insulative layer of the electric circuit board, the metal layer being patterned to have a plurality of strips, the cores of the optical waveguide being disposed in a position corresponding to a site where the metal layer is removed by the patterning.

The method of manufacturing the opto-electric hybrid board comprises the steps of: forming an insulative layer on a first surface of a metal layer; forming electrical interconnect lines on a surface of the insulative layer; and forming an optical waveguide on a second surface of the metal layer, the metal layer being etched to form a pattern having a plurality of strips prior to the step of forming the optical waveguide, and cores of the optical waveguide being disposed in a position corresponding to a site where the metal layer is removed by the etching.

In the opto-electric hybrid board, the metal layer is patterned to have a plurality of strips. In other words, the metal layer is formed dispersedly, rather than entirely. Thus, the opto-electric hybrid board is high inflexibility. This allows the use of the opto-electric hybrid board which is bendable, thereby providing a higher degree of freedom in the use of the opto-electric hybrid board. If the opto-electric hybrid board is impacted, the opto-electric hybrid board is easily deformed to lessen the impact. The aforementioned deformation, if any, occurs preferentially in the site where the metal layer is removed by the patterning. However, the strips formed by the patterning of the metal layer serve as a reinforcement. This prevents stresses and slight bending in the cores of the optical waveguide to suppress the increase in the light propagation losses in the optical waveguide. In this manner, the opto-electric hybrid board is excellent in flexibility, and is also excellent in suppressing the increase in light propagation losses.

Preferably, part of the opto-electric hybrid board is formed as a to-be-bent portion; the metal layer is partially removed in a position corresponding to the to-be-bent portion; and the cladding layer of the optical waveguide fills a site where the metal layer is removed. In such a case, the metal layer does not hinder bending but is hence excellent in bendability. The repeated bending in the site where the metal layer is removed causes no breaks in the metal layer to cause no breaks in the cores of the optical waveguide. Thus, the opto-electric hybrid board is excellent in resistance to repeated bending. The site where the metal layer is removed is not hollow but is filled with the cladding layer of the optical waveguide. This stabilizes the shape of the cores of the optical waveguide to maintain proper light propagation even if the to-be-bent portion is bent.

In the method of manufacturing the opto-electric hybrid board, the metal layer of the opto-electric hybrid board is etched to form a pattern having a plurality of strips, and thereafter the optical waveguide is formed so that the cores of the optical waveguide are disposed in a position corresponding to a site where the metal layer is removed by the etching. Thus, the opto-electric hybrid board excellent in flexibility and also excellent in suppressing the increase in light propagation losses as mentioned above is easily provided.

Preferably, a portion of the metal layer corresponding to a to-be-bent portion of the opto-electric hybrid board is removed by etching in the step of etching the metal layer. In such a case, the opto-electric hybrid board excellent in bendability and also excellent in resistance to repeated bending as mentioned above is easily provided.

DETAILED DESCRIPTION OF THE INVENTION

Preferred embodiments according to the present invention will now be described in detail with reference to the drawings.

Figure 1A:
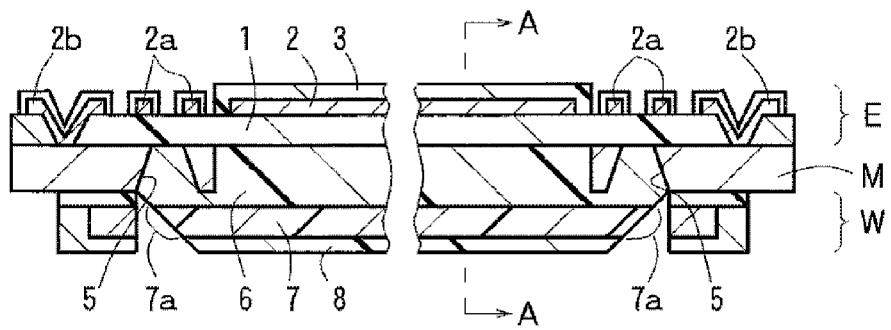
FIG. 1A is a longitudinal sectional view schematically showing an opto-electric hybrid board according to a first preferred embodiment.
Figure 1B:
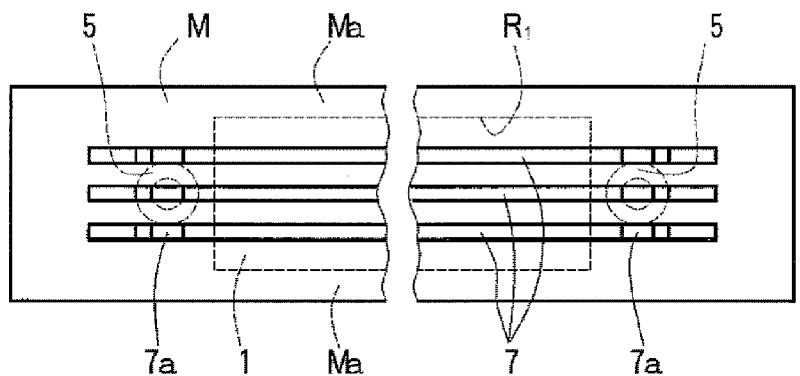
FIG. 1B is a bottom view schematically showing the arrangement of strips and cores shown in FIG. 1A.
Figure 1C:
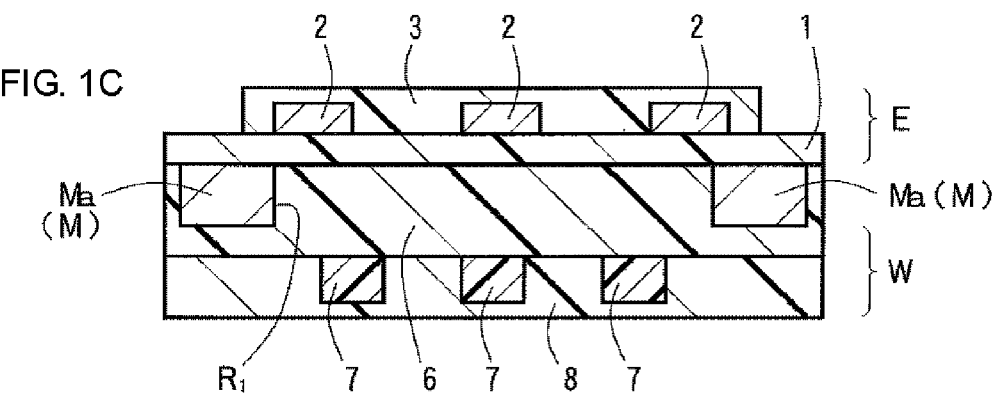
FIG. 1C is an enlarged view of a section taken along the line A-A of FIG. 1A.

FIG. 1A is a longitudinal sectional view schematically showing an opto-electric hybrid board according to a first preferred embodiment. FIG. 1B is a bottom view showing the arrangement of strips Ma formed by patterning a metal layer M and cores 7 of an optical waveguide W in the opto-electric hybrid board, although only the configuration of the metal layer M (the strips Ma), the cores 7 and the like is shown partially for ease of understanding of the arrangement. FIG. 1C is an enlarged view of a cross section (a section taken along the line A-A of FIG. 1A) of the opto-electric hybrid board. As shown in FIG. 1A, the opto-electric hybrid board according to the first preferred embodiment is a strip-shaped opto-electric hybrid board which includes: an electric circuit board E including an insulative layer 1 having front and back surfaces, and electrical interconnect lines 2 formed on the front surface of the insulative layer 1; the optical waveguide W formed on the back surface of the insulative layer 1 of the electric circuit board E; and the metal layer M formed between the optical waveguide W and the back surface of the insulative layer 1 of the electric circuit board E. As shown in FIG. 1B, a central portion of the metal layer M is removed by etching so that two (a plurality of) strips Ma are left on opposite sides as seen in the width direction in the vertical direction shown in the figure), whereby the metal layer M is patterned to have the two strips Ma. As shown in FIGS. 1B and 1C, the cores 7 (three cores 7 shown in the figures) of the optical waveguide W are disposed in a position corresponding to a site (widthwise middle portion) $R_1$ where the metal layer M is removed by the patterning.

The opto-electric hybrid board is rich in flexibility because the metal layer M is absent between the two strips Ma lying on the opposite sides as seen in the width direction. Part of the opto-electric hybrid board where the metal layer M is absent is prone to deformation. However, the two strips Ma serve as a reinforcement to prevent stresses and slight bending in the cores 7 of the optical waveguide W. As a result, the increase in light propagation losses in the optical waveguide W is suppressed.

More specifically, the electric circuit board E includes the insulative layer 1, and the electrical interconnect lines 2 formed on the front surface of the insulative layer 1, as stated above. In opposite longitudinal end portions of the opto-electric hybrid board, uncovered optical element mounting pads 2a are formed on the front surface of the insulative layer 1, and uncovered grounding electrodes 2b extend through the insulative layer 1 into contact with the metal layer M on the back surface of the insulative layer 1. The optical element mounting pads 2a and the grounding electrodes 2b are portions of the electrical interconnect lines 2. Portions of the electrical interconnect lines 2 other than the optical element mounting pads 2a and the grounding electrodes 2b are covered with a coverlay 3, and are insulated and protected. The insulative layer 1 is transparent.

The central portion of the metal layer M is removed so that the multiple (in the figure, two) strips Ma are left, as stated above. The opposite longitudinal end portions of the metal layer M have through holes 5 for a light path which are in positions corresponding respectively to the optical element mounting pads 2a of the electric circuit board E (with reference to FIG. 1A).

The optical waveguide W includes a first cladding layer (under cladding layer) 6, the cores 7 formed in a predetermined pattern on the front surface (the lower surface as seen in FIGS. 1A and 1C) of the first cladding layer 6, and a second cladding layer (over cladding layer) 8 formed on the front surface of the first cladding layer 6 so as to cover the cores 7. The first cladding layer 6 has a back surface (a surface opposite from the surface with the cores 7 formed thereon) in contact with the metal layer M, and fills the site $R_1$ where the metal layer M is removed and the through holes 5 for an optical path. In the opposite longitudinal end portions of the optical waveguide W, portions of the cores 7 corresponding to the optical element mounting pads 2a of the electric circuit board E are in the form of inclined surfaces at 45 degrees with respect to the longitudinal direction of the cores 7. The inclined surfaces serve as reflecting surfaces 7a capable of reflecting light beams to propagate light beams between an optical element mounted on the optical element mounting pads 2a and the cores 7. At the reflecting surfaces 7a, the refractive index of the cores 7 is higher than that of air present outside the reflecting surfaces 7a. For this reason, when light beams coming from a light-emitting element (an optical element) and propagated through the cores 7 impinge upon the reflecting surfaces 7a, a majority of the light beams are reflected from the reflecting surfaces 7a to change the optical path thereof by 90 degrees.

Next, a method of manufacturing the opto-electric hybrid board will be described (with reference to FIGS. 2A to 2D, 3, and 4A to 4C).

First, the metal layer M of a flat configuration (with reference to FIG. 2A) is prepared. Examples of a material for the formation of the metal layer M include stainless steel, copper, silver, aluminum, nickel, chromium, titanium, platinum and gold. In particular, stainless steel is preferable from the viewpoint of bending resistance and the like. The metal layer M has a thickness in the range of 10 to 70 μm, for example.

Figure 2A:
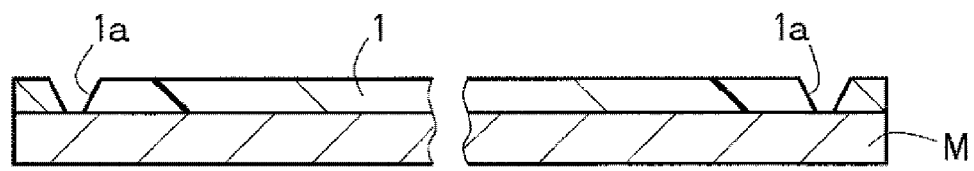
FIGS. 2A to 2D are illustrations schematically showing the steps of producing an electrical circuit board in a method of manufacturing the opto-electric hybrid board.

Next, as shown in FIG. 2A, a photosensitive insulating resin including a polyimide resin and the like is applied to the front surface of the metal layer M to form the insulative layer 1 having a predetermined pattern by a photolithographic process. In the first preferred embodiment, holes 1a which uncover the front surface of the metal layer M are formed in the opposite longitudinal end portions, respectively, of the insulative layer 1 for the purpose of forming the grounding electrodes 2b for contact with the metal layer M. The insulative layer 1 has a thickness in the range of 3 to 50 μm.

Figure 2B:
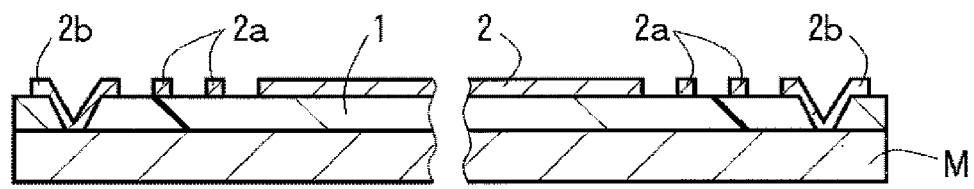

Next, as shown in FIG. 2B, the electrical interconnect lines 2 (including the optical element mounting pads 2a and the grounding electrodes 2b) are formed by a semi-additive process, for example. The semi-additive process is as follows. First, a metal film (not shown) made of copper, chromium and the like is formed on the front surface of the insulative layer 1 by sputtering, electroless plating or the like. This metal film serves as a seed layer (a layer serving as a basis material for the formation of an electroplated layer) for a subsequent electroplating process. Then, a photosensitive resist (not shown) is laminated to the opposite surfaces of a laminate comprised of the metal layer M, the insulative layer 1, and the seed layer. Thereafter, a photolithographic process is performed to form holes having the pattern of the electrical interconnect lines 2 (including the optical element mounting pads 2a and the grounding electrodes 2b) in the photosensitive resist on the side where the seed layer is formed, so that surface portions of the seed layer are uncovered at the bottoms of the holes. Next, electroplating is performed to form an electroplated layer made of copper and the like in a stacked manner on the surface portions of the seed layer uncovered at the bottoms of the holes. Then, the photosensitive resist is stripped away using an aqueous sodium hydroxide solution and the like. Thereafter, a portion of the seed layer on which the electroplated layer is not formed is removed by soft etching. Laminate portions comprised of the remaining seed layer and the electroplated layer are the electrical interconnect lines 2 (including the optical element mounting pads 2a and the grounding electrodes 2b).

Figure 2C:
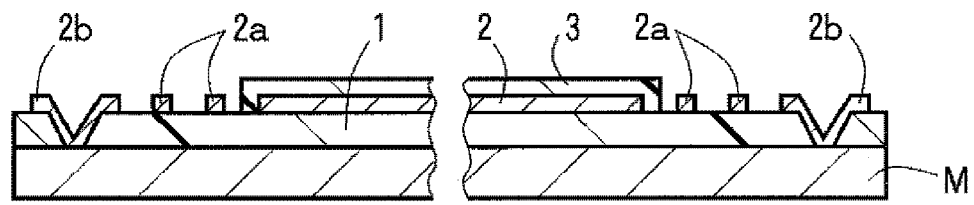

Then, an electroless plated layer made of nickel and the like (not shown) is formed on the front surface of the electrical interconnect lines 2 (including the optical element mounting pads 2a and the grounding electrodes 2b). Thereafter, as shown in FIG. 2C, a photosensitive insulating resin including a polyimide resin and the like is applied to a portion of the electrical interconnect lines 2 other than the optical element mounting pads 2a and the grounding electrodes 2b to form the coverlay 3 by a photolithographic process.

Figure 2D:
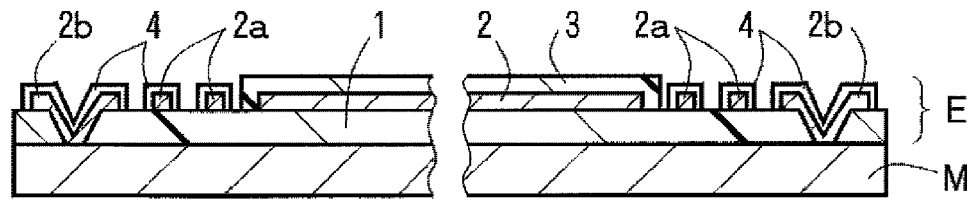

Then, the electroless plated layer (not shown) formed on the optical element mounting pads 2a and the grounding electrodes 2b is removed by etching. Thereafter, electroplated layers 4 made of gold, nickel and the like are formed in sites where the electroless plated layer is removed, as shown in FIG. 2D. In this manner, the electric circuit board E is formed on the front surface of the metal layer M.

Next, a photosensitive resist (not shown) is laminated to the opposite surfaces of a laminate comprised of the metal layer M and the electric circuit board E. Thereafter, holes are formed by a photolithographic process in portions of the photosensitive resist on the back surface (the surface opposite from the electric circuit board E) of the metal layer M which correspond to the widthwise middle portion and portions where the through holes for an optical path are to be formed, so that back surface portions of the metal layer M are uncovered at the bottoms (the top surfaces as seen in the figure) of the holes.

Figure 3:
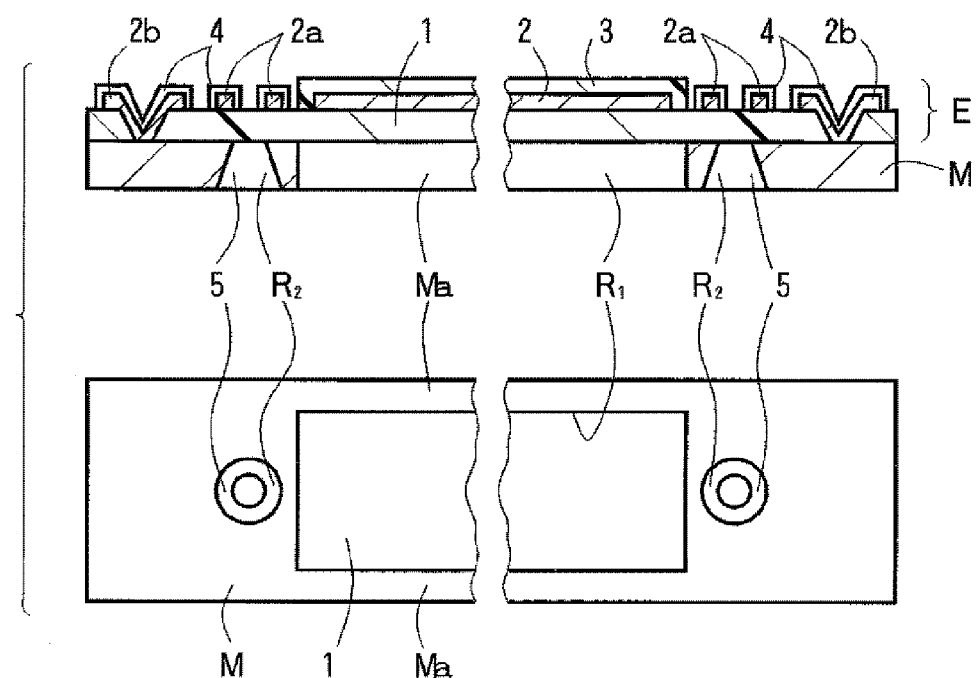
FIG. 3 is an illustration schematically showing the step of etching a metal layer in the method of manufacturing the opto-electric hybrid board.

Then, as shown in FIG. 3 (in which an upper portion is a longitudinal sectional view, and a lower portion is a bottom view), the portions of the metal layer M uncovered at the bottoms of the holes are removed by etching using an aqueous etching solution for the metal material of the metal layer M (for example, an aqueous ferric chloride solution for a stainless steel layer), so that the insulative layer 1 is uncovered at the bottoms (the top surfaces as seen in the longitudinal sectional view) of the sites $R_1$ and $R_2$ where the metal layer M is removed. Of the sites $R_1$ and $R_2$, the site $R_1$ in the widthwise middle portion lies between the two strips Ma, and the sites $R_2$ in opposite end portions correspond to the through holes 5 for an optical path. Thereafter, the photosensitive resist is stripped away using an aqueous sodium hydroxide solution and the like.

Figure 4A:
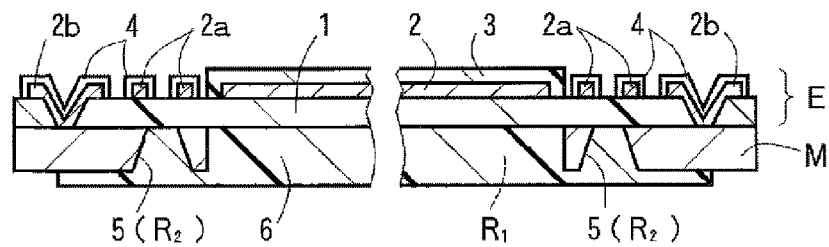
FIGS. 4A to 4C are illustrations schematically showing the steps of producing an optical waveguide in the method of manufacturing the opto-electric hybrid board.

For the formation of the optical waveguide W (with reference to FIG. 1A) on the back surface of the metal layer M, a photosensitive resin which is a material for the formation of the first cladding layer (under cladding layer) 6 is applied to the back surface (the lower surface as seen in the figure) of the metal layer M, as shown in FIG. 4A. Thereafter, the applied layer is exposed to irradiation light. This exposure cures the applied layer to form the first cladding layer 6. The first cladding layer 6 fills the widthwise middle portion (the site $R_1$) and the through holes 5 for an optical path (the sites $R_2$) where the metal layer M is removed by etching. The first cladding layer 6 in the first preferred embodiment has a thickness (as measured from the back surface of the insulative layer 1) greater than that of the metal layer M. It should be noted that the back surface of the metal layer M is positioned to face upward when the optical waveguide W is formed (when the aforementioned first cladding layer 6, the cores 7 to be described later and the second cladding layer 8 to be described later are formed).

Figure 4B:
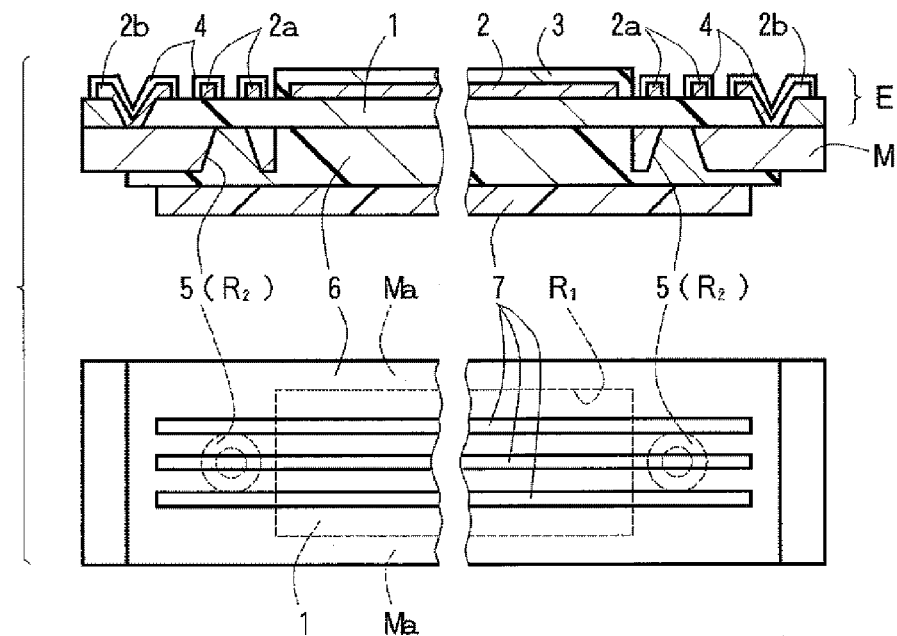

Then, as shown in FIG. 4B (in which an upper portion is a longitudinal sectional view, and a lower portion is a bottom view), the cores 7 having a predetermined pattern are formed on the front surface (the lower surface as seen in the longitudinal sectional view) of the first cladding layer 6 by a photolithographic process. In this process, the cores 7 are disposed between the two strips Ma of the metal layer M. The cores 7 have a thickness in the range of 20 to 100 μm, and a width in the range of 10 to 100 μm. An example of a material for the formation of the cores 7 includes a photosensitive resin similar to that for the first cladding layer 6, and the material used herein has a refractive index higher than that of the material for the formation of the aforementioned first cladding layer 6 and the second cladding layer 8 to be described below (with reference to FIG. 4C). The adjustment of the refractive index may be made, for example, by adjusting the selection of the types of the materials for the formation of the first cladding layer 6, the cores 7 and the second cladding layer 8, and the composition ratio thereof.

Figure 4C:
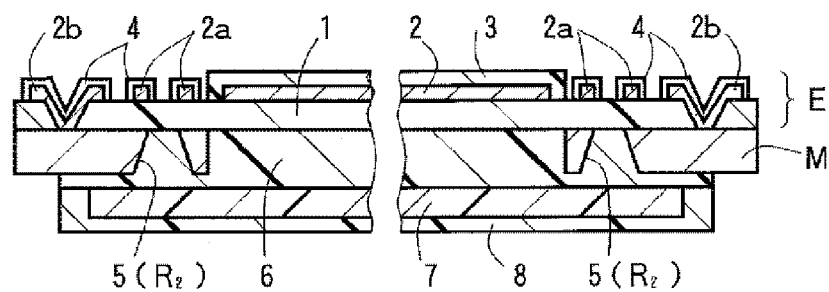

Next, as shown in FIG. 4C, the second cladding layer 8 is formed on the front surface (the lower surface as seen in the figure) of the first cladding layer 6 by a photolithographic process so as to cover the cores 7. The second cladding layer 8 has a thickness (as measured from the front surface of the first cladding layer 6) not less than that of the cores 7 and not greater than 300 μm. An example of a material for the formation of the second cladding layer 8 includes a photosensitive resin similar to that for the first cladding layer 6.

Then, portions (opposite end portions) of the optical waveguide W (positioned in a lower part in the figure) corresponding to the optical element mounting pads 2a of the electric circuit board E are formed into inclined surfaces inclined at 45 degrees with respect to the longitudinal direction of the cores 7 by laser beam machining, cutting using a rotary blade and the like having an included angle of 45 degrees, and the like (with reference to FIG. 1A). Portions of the cores 7 positioned at the inclined surfaces function as the light reflecting surfaces 7a. In this manner, the optical waveguide W is formed on the back surface of the metal layer M. This provides the opto-electric hybrid board shown in FIGS. 1A to 1C.

Figure 5:
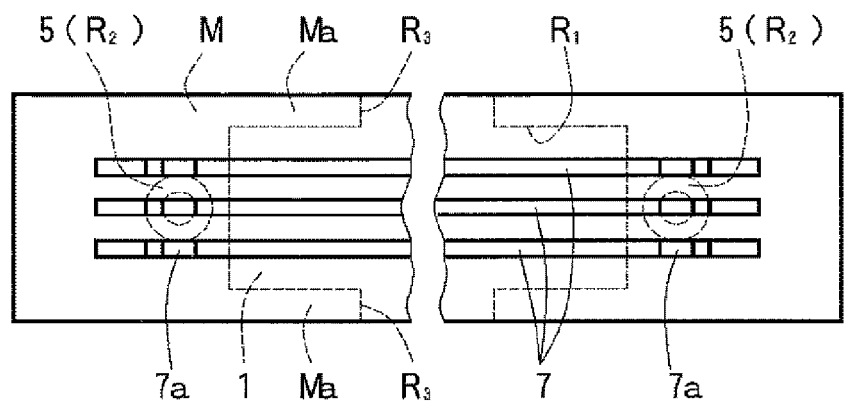
FIG. 5 is a bottom view schematically showing the arrangement of strips and cores in an opto-electric hybrid board according to a second preferred embodiment.

FIG. 5 is a bottom view (corresponding to FIG. 1B) schematically showing the arrangement of the strips Ma and the cores 7 in an opto-electric hybrid board according to a second preferred embodiment. The opto-electric hybrid board according to the second preferred embodiment is configured such that the longitudinal middle portion of the opto-electric hybrid board of the first preferred embodiment (with reference to FIGS. 1A to 1C) is a to-be-bent portion so that the longitudinal end portions (the left-hand and right-hand end portions as seen in the figure) are raised (raised in a direction perpendicular to the plane of the figure) with respect to the longitudinal middle portion and such that portions of the metal layer M extending to opposite edges as seen in the width direction are removed in the to-be-bent portion (the longitudinal middle portion). The first cladding layer (under cladding layer) 6 of the optical waveguide W fills sites $R_3$ where the aforementioned portions of the metal layer M are removed, as well as the site $R_1$. Other parts of the second preferred embodiment are similar to those of the first preferred embodiment. Like reference numerals and characters are used to designate parts similar to those of the first preferred embodiment.

The opto-electric hybrid board according to the second preferred embodiment has functions and effects to be described below in addition to the functions and effects of the first preferred embodiment. The metal layer M, which is partially removed in corresponding relation to the to-be-bent portion, does not hinder bending but is excellent in bendability in the longitudinal direction. The repeated bending in the site where the metal layer M is removed causes no breaks in the metal layer M to cause no breaks in the cores 7 of the optical waveguide W. Thus, the opto-electric hybrid board is excellent in resistance to repeated bending. The sites $R_3$ where the metal layer M is removed are not hollow but are filled with the first cladding layer (under cladding layer) 6 of the optical waveguide W. This stabilizes the shape of the cores 7 of the optical waveguide W to maintain proper light propagation if the to-be-bent portion is bent. The optical waveguide W may be positioned either inside or outside when the opto-electric hybrid board is bent.

A method of manufacturing the opto-electric hybrid board according to the second preferred embodiment will be described below. The manufacturing method of the second preferred embodiment until the step of forming the electric circuit board E on the front surface of the metal layer M is similar to that of the first preferred embodiment (with reference to FIGS. 2A to 2D). In the subsequent step of etching the metal layer M (with reference to FIG. 3), the portion of the metal layer M corresponding to the to-be-bent portion (longitudinal middle portion), in addition to the portion of the metal layer M between the two strips Ma (the widthwise middle portion) and the portions thereof corresponding to the through holes 5 for an optical path, is removed by etching. The step of forming the optical waveguide W and its subsequent steps are similar to those of the first preferred embodiment (with reference to FIGS. 4A to 4C).

Figure 6:
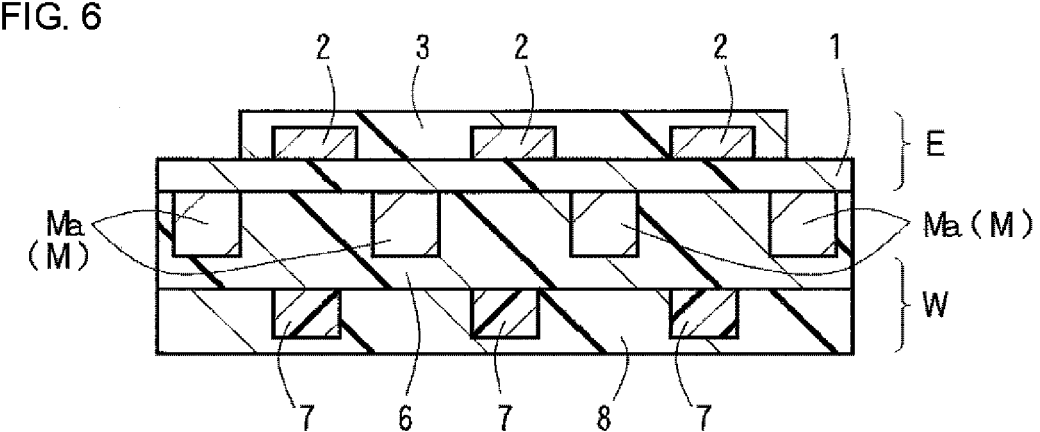
FIG. 6 is a cross-sectional view schematically showing an opto-electric hybrid board according to a third preferred embodiment.

FIG. 6 is a cross-sectional view (corresponding to FIG. 1C) schematically showing an opto-electric hybrid board according to a third preferred embodiment. In the opto-electric hybrid board according to the third preferred embodiment, the metal layer M is patterned to have a plurality of (in the figure, four) strips Ma, and each core 7 is disposed in corresponding relation to a position lying between adjacent ones of the strips Ma. Other parts of the third preferred embodiment are similar to those of the first preferred embodiment. Like reference numerals and characters are used to designate parts similar to those of the first preferred embodiment. The third preferred embodiment has functions and effects similar to those of the first preferred embodiment.

Figure 7:
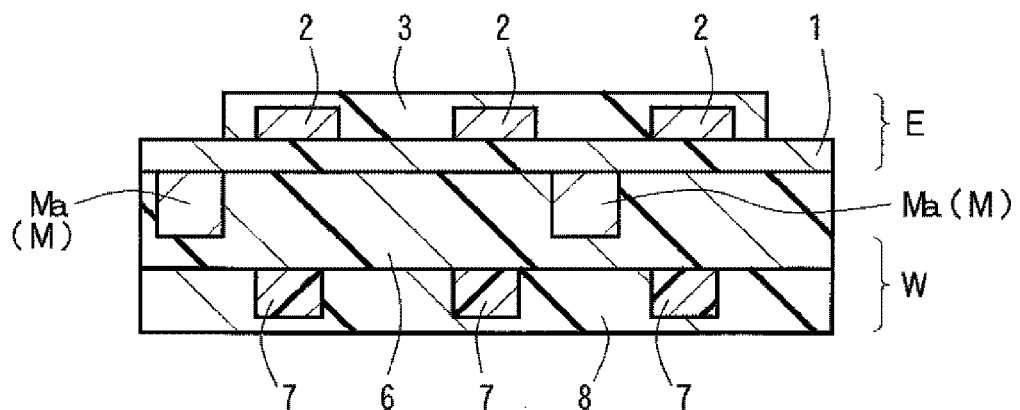
FIG. 7 is a cross-sectional view schematically showing an opto-electric hybrid board according to a fourth preferred embodiment.

FIG. 7 is a cross-sectional view (corresponding to FIG. 1C) schematically showing an opto-electric hybrid board according to a fourth preferred embodiment. In the opto-electric hybrid board according to the fourth preferred embodiment, the metal layer M is patterned to have two strips Ma, and two cores 7 are disposed in corresponding relation to a position lying between the two strips Ma whereas one core 7 is disposed in corresponding relation to a position outside the two strips Ma. Other parts of the fourth preferred embodiment are similar to those of the first preferred embodiment. Like reference numerals and characters are used to designate parts similar to those of the first preferred embodiment. The fourth preferred embodiment has functions and effects similar to those of the first preferred embodiment.

In the third and fourth preferred embodiments, the longitudinal middle portion may be defined as the to-be-bent portion, as in the second preferred embodiment. In this case, the portion of the metal layer M corresponding to the to-be-bent portion (the longitudinal middle portion) is removed, and the sites $R_3$ where the metal layer M is removed is filled with the first cladding layer (under cladding layer) 6 of the optical waveguide W.

Figure 8:
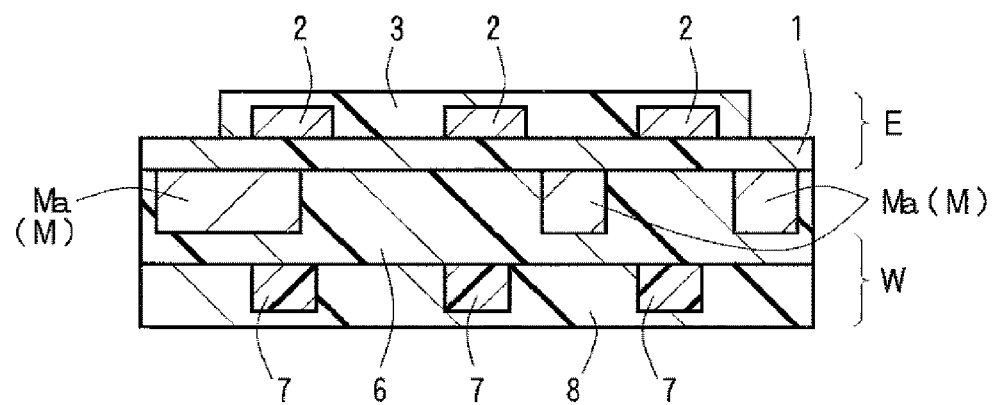
FIG. 8 is a cross-sectional view schematically showing an opto-electric hybrid board according to a modification of the preferred embodiments.

In the aforementioned preferred embodiments, the cores 7 are not disposed in positions corresponding to the strips Ma. However, as shown in FIG. 8, at least one of the cores 7 (in the figure, the leftmost core 7) may be disposed so that part of the at least one core 7 as seen in the width direction is positioned to correspond to the strips Ma.

Further, the metal layer M may be partially left unremoved between adjacent ones of the strips Ma so that adjacent ones of the strips Ma are partially connected to each other, and the connections may be reinforced.

Figure 9:
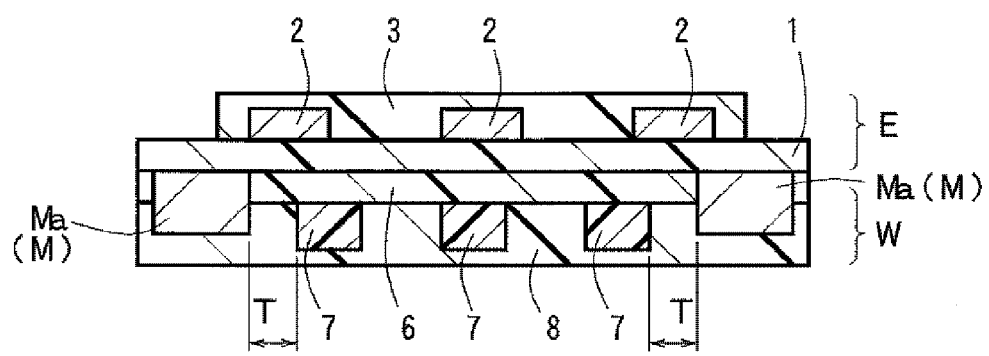
FIG. 9 is a cross-sectional view schematically showing an opto-electric hybrid board according to another modification of the preferred embodiments.

In the aforementioned preferred embodiments, the thickness of the first cladding layer 6 as measured from the back surface of the insulative layer 1 is greater than the thickness of the metal layer M so that the cores 7 are outside the range of the thickness of the metal layer M. However, as shown in FIG. 9, the cores 7 may be partially within the range of the thickness of the metal layer M. This reduces the thickness of the opto-electric hybrid board to further improve the flexibility thereof. For such an instance, the thickness of the first cladding layer 6 is made less than that of the metal layer M. In this case, the spacing T between a side surface of each of the strips Ma and a side surface of the nearest one of the cores 7 to each strip Ma is preferably not less than 5 μm from the viewpoint of forming the second cladding layer 8 in the spacing. If the spacing T is excessively large, the reinforcing effect of the strips Ma is not provided. For this reason, the spacing T is not more than 1000 μm.

Next, inventive examples of the present invention will be described in conjunction with comparative examples. It should be noted that the present invention is not limited to the inventive examples.

EXAMPLES

Inventive Examples 1 and 2

The opto-electric hybrid board in the first preferred embodiment was prepared as an opto-electric hybrid board in Inventive Example 1, and the opto-electric hybrid board in the second preferred embodiment was prepared as an opto-electric hybrid board in Inventive Example 2. Each of the opto-electric hybrid boards in Inventive Examples 1 and 2 included a stainless steel layer (metal layer) having a thickness of 18 μm, an insulative layer having a thickness of 5 μm, a first cladding layer having a thickness (as measured from the back surface of the insulative layer) of 10 μm, cores having a thickness of 50 μm and a width of 80 μm, and a second cladding layer having a thickness (as measured from the front surface of the first cladding layer) of 70 μm. The spacing between two strips was 2300 μm. The spacing between a side surface of each strip and a side surface of the nearest one of the cores to each strip was 860 μm. The spacing between adjacent ones of the cores was 420 μm.

Comparative Examples 1 and 2

Figure 10:
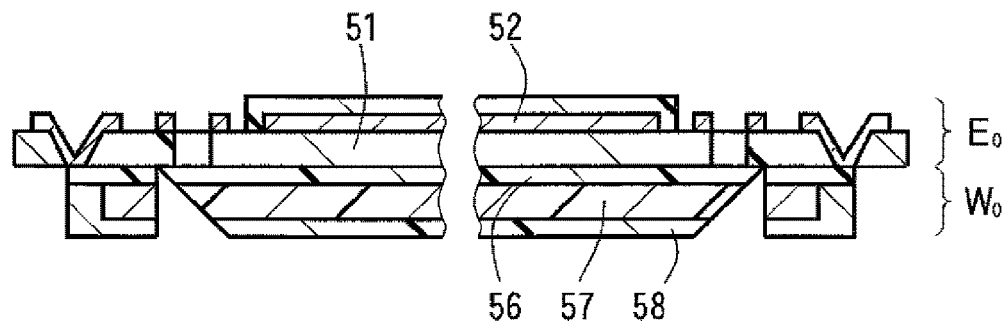
FIG. 10 is a longitudinal sectional view schematically showing a conventional opto-electric hybrid board.
Figure 11:
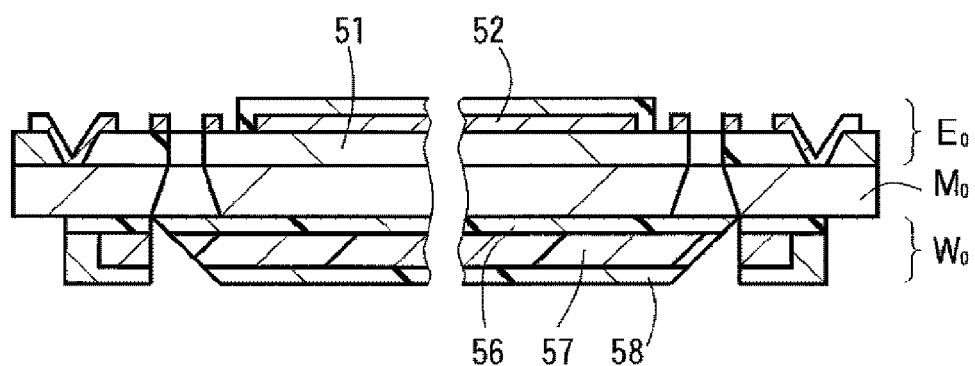
FIG. 11 is a longitudinal sectional view schematically showing another conventional opto-electric hybrid board.

The opto-electric hybrid board shown in FIG. 10 was prepared as an opto-electric hybrid board in Comparative Example 1, and the opto-electric hybrid board shown in FIG. 11 was prepared as an opto-electric hybrid board in Comparative Example 2. The components, including the stainless steel layer and the like, of the opto-electric hybrid boards in Comparative Examples 1 and 2 had dimensions equal to those in Inventive Examples 1 and 2.

<Measurement of Light Propagation Losses>

A light-emitting element (ULM850-10-TT-C0104U available from U-L-M photonics GmbH) and a light-receiving element (PDCA04-70-GS available from Albis Optoelectronics AG) were prepared. The amount of light $I_0$ was measured when light emitted from the light-emitting element was directly received by the light-receiving element. Then, the light-emitting element was mounted on optical element mounting pads in one end portion of each of the opto-electric hybrid boards in Inventive Examples 1 and 2 and Comparative Examples 1 and 2, and the light-receiving element was mounted on optical element mounting pads in the other end portion thereof. Next, the amount of light I was measured when light emitted from the light-emitting element was received by the light-receiving element via the cores of the optical waveguide. Based on the values of the amounts of light $I_0$ and I, [$-10 \times \log (I/I_0)$] was calculated, and divided by the length of the cores. The results of the division were determined as light propagation losses. The results were listed in Table 1 below.

<Flexibility>

Each of the opto-electric hybrid boards in Inventive Examples 1 and 2 and Comparative Examples 1 and 2 was held in hands and bent by the hands, and the flexibility of each opto-electric hybrid board was evaluated. The results were listed in Table 1 below in which an opto-electric hybrid board which was relatively prone to deformation was evaluated as being excellent in flexibility and indicated by an open circle, and an opto-electric hybrid board which was relatively less prone to deformation was evaluated as being poor in flexibility and indicated by a cross.

TABLE 1

|  | Inv. Ex. 1 | Inv. Ex. 2 | Comp. Ex. 1 | Comp. Ex. 2 |
| --- | --- | --- | --- | --- |
| Light Propagation Loss (dB/cm) | 0.10 | 0.11 | 0.27 | 0.09 |
| Flexibility | ○ | ○ | ○ | x |

The results in Table 1 show that the light propagation losses in Inventive Examples 1 and 2 make no significant difference from the light propagation loss in Comparative Example 2 including the stainless steel layer. However, the results in Table 1 show that Inventive Examples 1 and 2 are more excellent in flexibility than Comparative Example 2. The results in Table 1 also show that Comparative Example 1 has flexibility but is high in light propagation loss.

The opto-electric hybrid board is usable in instances where flexibility is required.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An opto-electric hybrid board, comprising:
    an electric circuit board including an insulative layer having front and back surfaces, and electrical interconnect lines formed on the front surface of the insulative layer;
    an optical waveguide including a cladding layer and cores, the optical waveguide being formed on the back surface of the insulative layer of the electric circuit board; and
    a metal layer formed between the cladding layer of the optical waveguide and the back surface of the insulative layer of the electric circuit board,
    wherein the metal layer is patterned to have a plurality of strips, and
    wherein the cores of the optical waveguide are disposed in a position corresponding to a site where the metal layer is removed by the patterning.

2. The opto-electric hybrid board according to claim 1,
    wherein part of the opto-electric hybrid board is formed as a to-be-bent portion;
    wherein the metal layer is partially removed in a position corresponding to the to-be-bent portion; and
    wherein the cladding layer of the optical waveguide fills a site where the metal layer is removed.

3. A method of manufacturing an opto-electric hybrid board, comprising:
    forming an insulative layer on a first surface of a metal layer;
    forming electrical interconnect lines on a surface of the insulative layer; and
    forming an optical waveguide on a second surface of the metal layer,
    wherein the metal layer is etched to form a pattern having a plurality of strips prior to the step of forming the optical waveguide, and
    wherein cores of the optical waveguide are disposed in a position corresponding to a site where the metal layer is removed by the etching.

4. The method according to claim 3, wherein a portion of the metal layer corresponding to a to-be-bent portion of the opto-electric hybrid board is removed by etching.

* * * * *

UNITED STATES PATENT AND TRADEMARK OFFICE
CERTIFICATE OF CORRECTION

PATENT NO.        : 8,768,114 B2                                                Page 1 of 1
APPLICATION NO.   : 13/775445
DATED             : July 1, 2014
INVENTOR(S)       : Yuichi Tsujita et al.

It is certified that error appears in the above-identified patent and that said Letters Patent is hereby corrected as shown below:

**\*\* On the title page item (72) \*\***
Change

(72) Inventors: Yuichi Tsujita, Ibaraki (JP); Yasuto
    "Ishimura"; Ibaraki (JP); Hiroyuki
    Hanazono, Ibaraki (JP); Naoyuki
    Tanaka, Ibaraki (JP); Yasufumi
    Yamamoto, Ibaraki (JP); Shotaro
    Masuda, Ibaraki (JP); Mayu Ozaki,
    Ibaraki (JP)

To be

(72) Inventors: Yuichi Tsujita, Ibaraki (JP); Yasuto
    --Ishimaru--; Ibaraki (JP); Hiroyuki
    Hanazono, Ibaraki (JP); Naoyuki
    Tanaka, Ibaraki (JP); Yasufumi
    Yamamoto, Ibaraki (JP); Shotaro
    Masuda, Ibaraki (JP); Mayu Ozaki,
    Ibaraki (JP)

Signed and Sealed this
Seventh Day of October, 2014

Michelle K. Lee
*Deputy Director of the United States Patent and Trademark Office*